Aug. 18, 1942.     N. F. FONER     2,293,199
VALVE
Filed Aug. 31, 1938     6 Sheets-Sheet 3
Fig. 10.
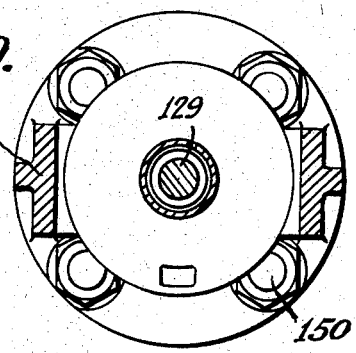
Fig. 4.
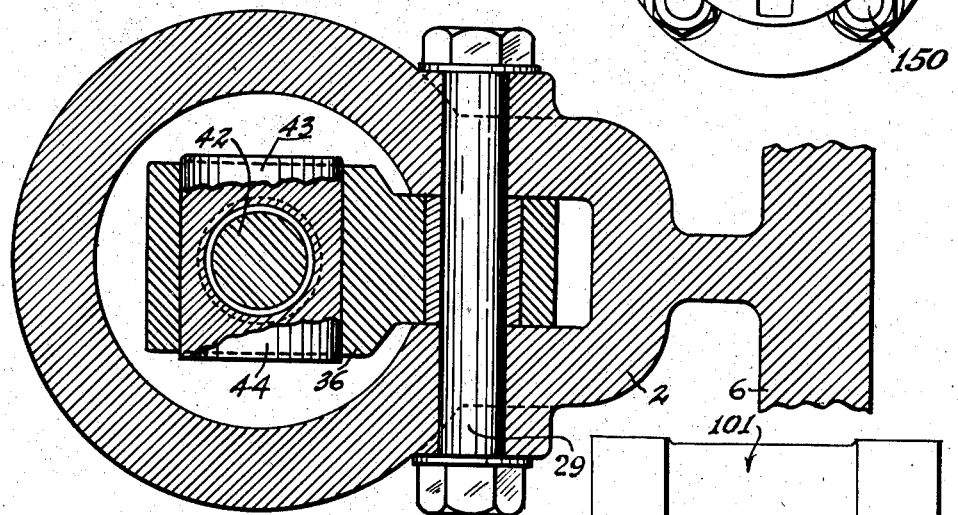
Fig. 5
Fig. 11.
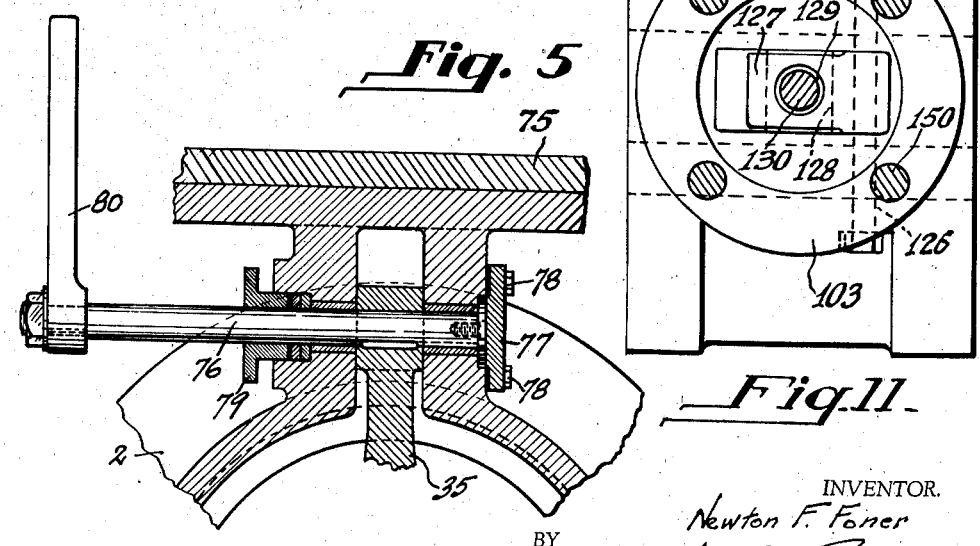
INVENTOR.
Newton F. Foner
BY
ATTORNEY.

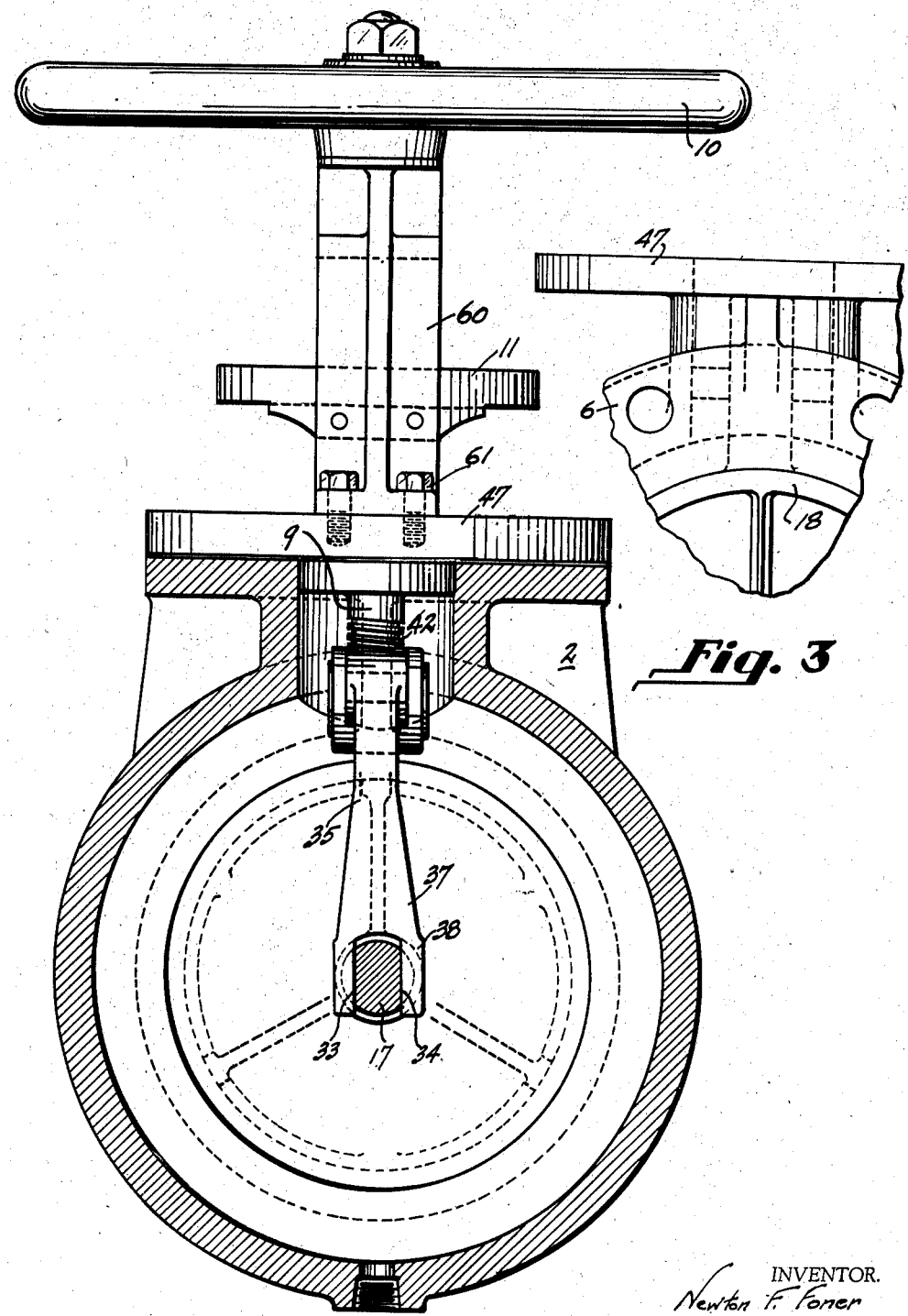

Aug. 18, 1942.   N. F. FONER   2,293,199
VALVE
Filed Aug. 31, 1938   6 Sheets-Sheet 4

INVENTOR.
Newton F. Foner
BY
ATTORNEY.

Patented Aug. 18, 1942

2,293,199

UNITED STATES PATENT OFFICE 2,293,199

VALVE

Newton F. Foner, Pittsburgh, Pa.

Application August 31, 1938, Serial No. 227,609

2 Claims. (Cl. 251—17)

My invention relates to valves.

One object of my invention is to provide a valve that is shaped and adaptable to establish a flow for various industrial conditions.

Another object of my invention is to provide a valve that is adaptable to permit a full flow by presenting an orifice or passage area at least equal to the cross-sectional area of the piping to which the valve is connected.

Another object of my invention is to provide a valve in which the flow passage is relatively concentrated at minimum valve openings in order to concentrate the fluid flow through the valve to prevent excessive dilution of the fluid, such as gas in the air to such a degree as to prevent ignition.

Another object of my invention is to provide a flow indicator for an associated valve.

Another object of my invention is to provide a recording device to record the flow during the period of use of the valve.

Other objects of my invention are to provide the improved and simplified features of construction and design to achieve valves of increased strength and relative simplicity and economy.

Several valve structures and associated equipment embodying the principles of my invention are illustrated in the accompanying drawings in which:

Figure 2 is a transverse view of the valve in Figure 1, partially in section and partially in elevation;

Figure 3 is an elevational view of a portion of the valve structure illustrating the location of a pivot pin;

Figure 4 is an enlarged sectional view of a universal self-adjusting nut connection for the operating stem of the valve;

Figure 5 is a transverse view of a portion of the valve similar to Figure 2, illustrating its modification for automatic operation;

Figure 10 is a transverse sectional view of the valve in Figure 8, looking down upon the metering attachment; and Figure 11 is a plan view with the top yoke removed from the valve in Figure 8.

Figure 1:
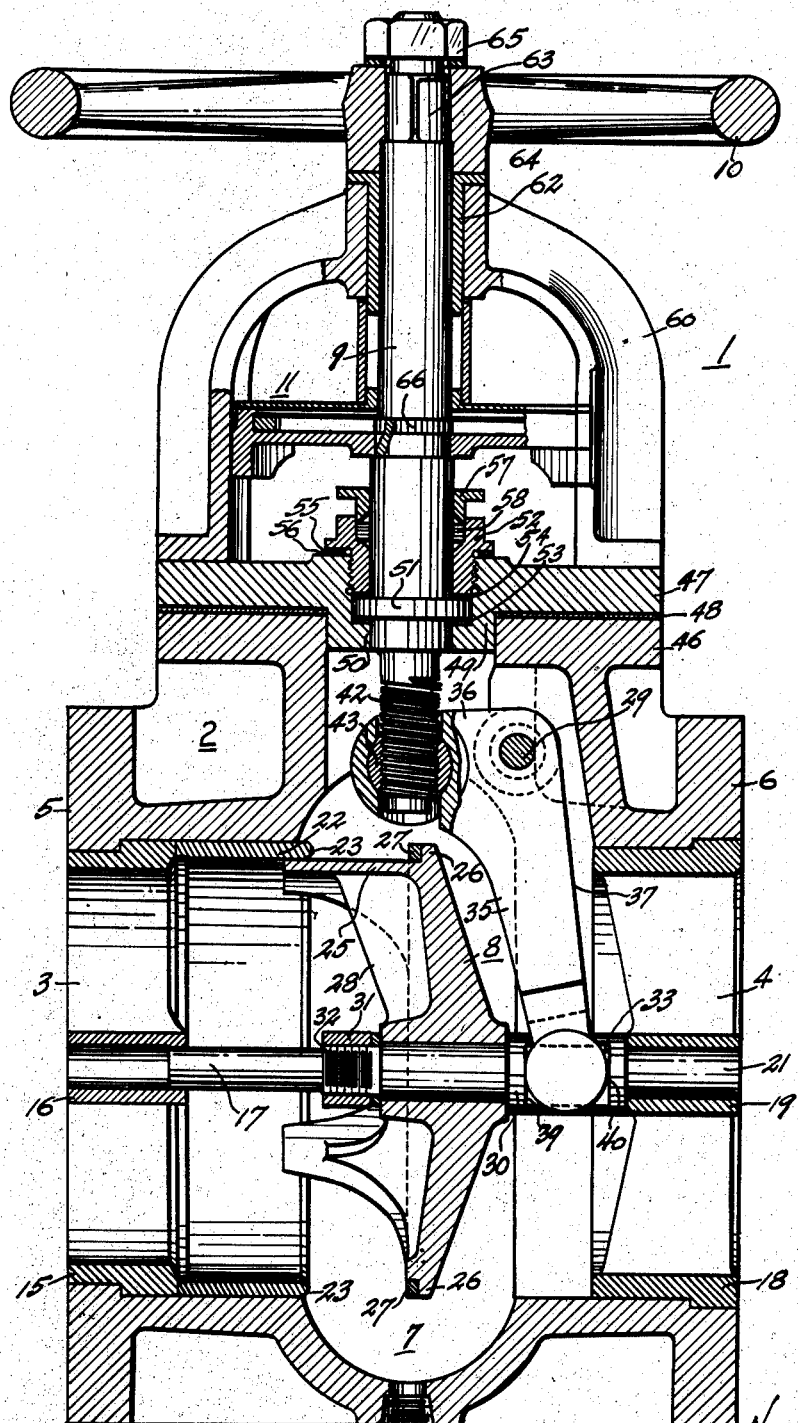
Figure 1 is a vertical, longitudinal, sectional view of one metering valve constructed in accordance with the principles of my invention.
Figure 6:
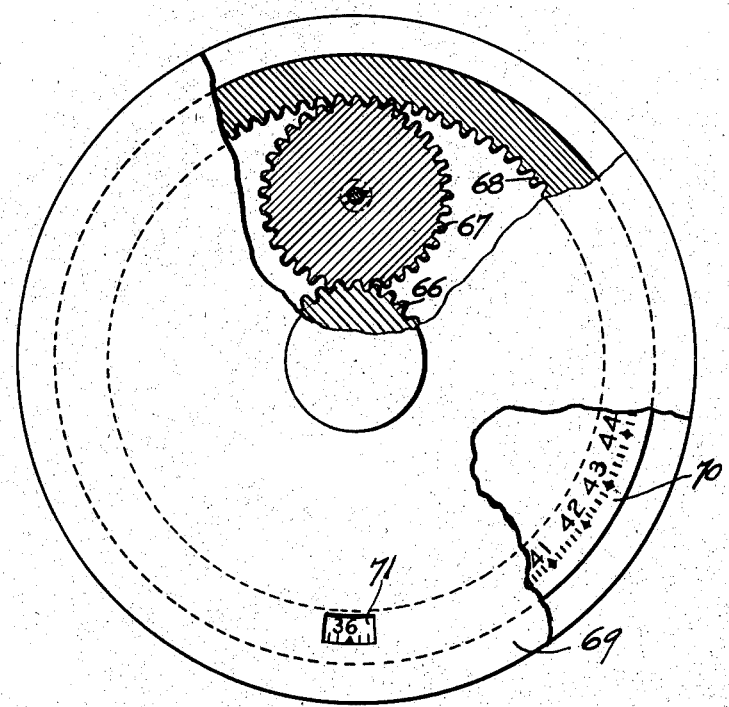
Figures 6 and 7 are respectively plan and side views, partially in section and partially in elevation with parts broken away, of the indicating metering attachment of the valve in Figure 1.
Figure 7:
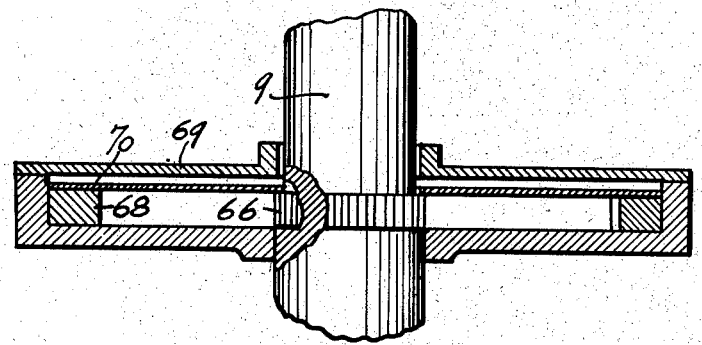

As shown in Figure 1, a valve 1 consists of a casing or housing 2, having an inlet passage 3, an outlet passage 4, and flanges 5 and 6, adjacent to the passages to permit the valve to be connected in the conduit system. A communicating passage 7 is disposed between the inlet passage 3 and the outlet passage 4. A valve 8 is supported for axial movement between the inlet passage 3 and the outlet passage 4, and operates to close and cap the inner end of the inlet passage 3 or to provide an opening from the inlet passage to the transfer passage to permit the movement of fluid through the valve.

The valve 8 is arranged to be axially shifted by an operating shaft or stem 9, the upper end of which serves as the operating end with a hand wheel 10 connected to the upper end of the stem 9 to impart rotation to the stem in order to shift the valve 8.

The rotational movement of the operating stem or shaft 9 is transferred to an indicating device 11 by means of which the extent of opening of the valve or flow is metered and indicated.

The valve casing or housing 2 is provided at its inlet opening with a spider or end bell 15 embodying a concentric bearing 16 to support one end of the shaft 17 for the valve 8.

The outlet end of the valve casing 2 is similarly provided with a spider end bell 18 embodying a concentric bearing 19 to support the outer end 21 of the shaft that supports the valve 8.

Directly behind the end bell spider 15 at the inlet opening of the valve, a cylindrical sleeve 22 is provided and tightly pressed into the valve casing, and the rear annular edge 23 of the sleeve 22 serves as a valve seat for engagement by the valve 8.

The valve 8 consists of a member that is generally of cup shape, with the cylindrical side wall or apron 25 arranged to provide a relatively easy sliding fit in the sleeve 22 that serves also as the valve seat.

In order to control the nature or type of flow according to the conditions that may be encountered in the system to which the valve is to be applied, the cylinder or apron 25 of the valve is provided with openings of such shape and areas as to establish a desired flow at the normal operating pressure in the system.

The valve 8 is also provided with a narrow flange 26, the front face of which supports a valve closing and sealing ring 27 of any suitable material, such as leather, rubber, or even soft metal, depending upon the nature of the fluid to be controlled by the valve. Strong ribs 28 may be provided for the valve as indicated.

The valve 8 is located in fixed position on its supporting shaft 17 between an enlarged flange portion 30 at the back of the valve and a locking nut 31, tightly secured on a threaded portion 32 of the supporting shaft 17. The enlarged portion 30 on the shaft also serves as an end stop to limit the axial movement of the shaft 17 against the bearing 19 in the end bell in the outlet passage 4 of the valve.

The enlarged portion 30 on the valve shaft 17 is provided with two vertically flat surfaces 33 and 34 to provide a simple arrangement for preventing rotation of the valve during its axial movement.

The valve 8 is axially moved by the stem 9 through a bell crank 35 that is pivotally supported on a pivot pin 29 held in fixed position between two side walls 37 and 38 of the main casing 2.

The bell crank 35 is provided with a short arm 36 that is operated by the stem 9 and is provided with a long arm 37 having a fork 38 at its end to fit over the shaft 17 to engage the flat surfaces 33 and 34 of the shaft 17. The ends of the fork 38 are of substantially circular shape and are arranged to provide a sliding fit with no lost motion between the end walls 39 and 40 adjacent the flat surfaces 33 and 34 in the valve shaft 17.

The operating bell crank 35 for the valve is operated by the valve stem 9 through a threaded section 42 at the lower end of the stem and a universal nut 43 supported on the arm 36 of the bell crank.

The universal nut 43 as shown in more detail in Figure 4 consists of a cylinder 44 having an outside diameter permitting a relatively, easy, sliding fit in the opening in the bell crank arm 36 which serves as a bearing for the self-adjusting cylindrical nut 44. The nut 44 is also provided with a transverse opening that is vertically disposed and threaded to receive the threaded end 42 of the valve stem 9. The nut 44 is thus free to adjust itself angularly about its own axis in the supporting opening in the arm of the bell crank and is also free to adjust itself axially in that opening in such manner as to adjust itself freely for any slight discrepancy in the co-planar location of the valve stem 9 and the bell crank 35. I consider this construction of the adjusting nut to be an important feature of the construction of this valve.

The top of the casing 2 is provided with an annular platform 46 surrounding an opening 47 through which the operating stem 9 extends into the casing to engage the operating nut for the bell crank. A flange cover 47 rests upon a gasket 48 on the top of the platform 46. The flange is held in proper centrally located position by a depending section 49 that is also provided with an inwardly extending flange 50 that serves as an end thrust stop for a flange 51 on the operating stem 9. The flange 50 cooperates with a stuffing box nut 52 and two packing washers 53 and 54 to hold the flange 51 of the stem 9 in position against end thrust movements upwardly or downwardly. The stuffing box nut 52 threads into a threaded portion at the top of the central opening in the annular plate flange 47. Two packing washers 55 and 56 of suitable material, one of which may be of soft material such as copper, serve as a sealing material between a flange on the gland nut 52 and the top surface of the flange plate 47.

A gland 57 and packing 58 serve further to seal the adjacent peripheral surface along the stem 9.

The operating stem 9 is thus held at its low end against vertical displacement by the location of the flange 51 between two confining surfaces and at its upper end by a yoke 60 that is secured to the casing 2 by bolts 61.

The head of the yoke is provided with a centrally located sleeve bearing 62 through which the operating stem 9 extends. The hand wheel 10 fits over a squared end 63 at the top of the stem 9 and is locked in position on the stem end against a top flange 64 of the sleeve 62 by a lock nut and washer combination 65.

In order to measure the rotation of the stem 9, the stem is provided with peripherally disposed gear teeth 66 that engage an idler 67 to rotate a floating ring gear 68 that is provided on its upper surface with a scale 70. The gear combination is covered by a cover plate 69 of any suitable material, which in the present instance is indicated as an opaque material provided with a window 71 through which a figure on the scale 70 is visible to indicate the quantity of flow corresponding to that portion of the valve or to indicate the extent of opening of the valve, depending upon the relationship of the scale to the gearing and the reduction between the threaded section of the stem and the nut supported in the bell crank.

In a modified form of the valve which is to be adapted to automatic control, the valve construction is similar to that already described except that the stem 9 is entirely removed with the yoke 60 and the flow indicating part, and the top of the valve closed by a solid flange plate 75 and the bell crank 35 is keyed to a shaft 76 that is used instead of the pivot pin 29 in the manual valve of Figure 1. The shaft 76 is supported between the two walls of the casing 2 in a manner similar to that in which the pivot pin 36 is supported, except that one opening adjacent one end of the shaft 76 is closed by a suitable cap 77, bolted by bolts 78 to the side of the casing and the other end of the shaft 76 extends through the packing gland 79 to a position where the outer end of the shaft 76 may be engaged and operated by a lever 80 connected to any suitable automatically controlled mechanism which is to position the valve in accordance with some predetermined condition.

The second valve 100 illustrated in Figures 8 to 11, inclusive, is particularly adapted for high pressure service. Valve 100 as illustrated, comprises a casing or housing 101 that may be considered as made up of a lower circular section 102, disposed with its axis horizontal, and having integrally secured thereto, as by welding, a top circular portion 103, disposed with its axis vertical and passing through the horizontal axis of the lower round section. The lower section of the casing is provided with passages extending axially clear through the body to provide an inlet passage 104 and an outlet passage 105. A bearing sleeve 106 is press fitted into the casing at the passage 104 and a bearing sleeve 107 is press fitted into the casing at the passage 105. A valve 108 is disposed for axial movement and is supported between the two sleeves 106 and 107, which serve as guide bearings for the valve. The valve 108 embodies a central capping or closure for the sleeve 106, the inner end of which serves as an annular seat 110 engaged by the cap 109 of the valve when the valve is to be closed. The valve 108 further embodies two axially extending sleeves 111 and 112, which serve to support the valve as it is axially moved between the two sleeve bearings 106 and 107. The cylinder 111 is provided with peripherally spaced openings, valve openings 113, 114, and 115, similarly shaped and having a total area at least equal to the total cross-section area of the inlet and outlet passages 104 and 105. A transfer passage 116 is provided between the sleeves 106 and 107 that define the inlet and the outlet passages and this transfer passage 116 serves as a communicating passage between the valve ports 113, 114, and 115 and transfer ports 117, 118 and 119 in the sleeve 112 of the valve on the opposite side of the central cap 109. The flow through the valve is thus through the inlet passage 104, through the valve ports 113, 114, and 115, through the transfer passage 116, through the transfer valve ports 117, 118, and 119 and thence through the outlet passage 105 of the valve. The back surface of the central body cap 109 is provided with a raised lug 120 provided with an opening to receive a pin 121 to permit two links 122 and 123 to be connected to the valve and to serve as elements to operate the valve. The other ends of the two links 122 and 123 are connected to the lower arm 124 of a bell crank 125, which is pivoted on a pivot pin 126 that extends between the side walls of the top part 103 of the casing. The other arm 127 of the bell crank is formed as a substantially enlarged circular body that is provided with an opening within which a cylindrical nut 128 is located. The cylindrical nut 128 is provided with a transverse central opening 129 which is threaded to receive a correspondingly threaded lower end of the operating stem 130.

The upper part of the valve casing 101 is closed by a flange plate 131 and is provided with an annular boss 132 on its lower surface that fits into a concentric annular seat 133 in the top surface of the casing. The plate 131 is provided with a central opening through which the lower end of the operating stem 130 extends. The stem is provided with a flange 135 which fits into an annular recess in the top surface of the plate 131 to provide a relatively close, sliding rotational fit. The under surface of the flange 135 is seated against a packing washer 136. The top surface of the flange 135 similarly presses against a packing washer 137 which extends across from the flange 135 to an annular seat 138 concentrically located on the top surface of the plate 131. A yoke 140 rests upon the plate 131 and suitable gasket material 141 is provided to seal the connection between the yoke and the plate 131.

The stem 130 rises through the central portion of the yoke base 142 and a gland nut 143 and packing 144 seals the opening through the yoke base.

The yoke is provided with a central table support 145 around the stem 130 upon which is supported a metering device similar to that shown in the valve in Figure 1.

The top of the stem 130 is provided with a hand wheel 146 that is locked to the stem by a lock nut combination 147 and the upper end of the stem is maintained in an aligning bearing 148 in the same manner as described in the valve in Figure 1. The yoke 140 is secured to the valve casing 101 by four bolts 150 as illustrated in Figures 10 and 11.

Figure 9:
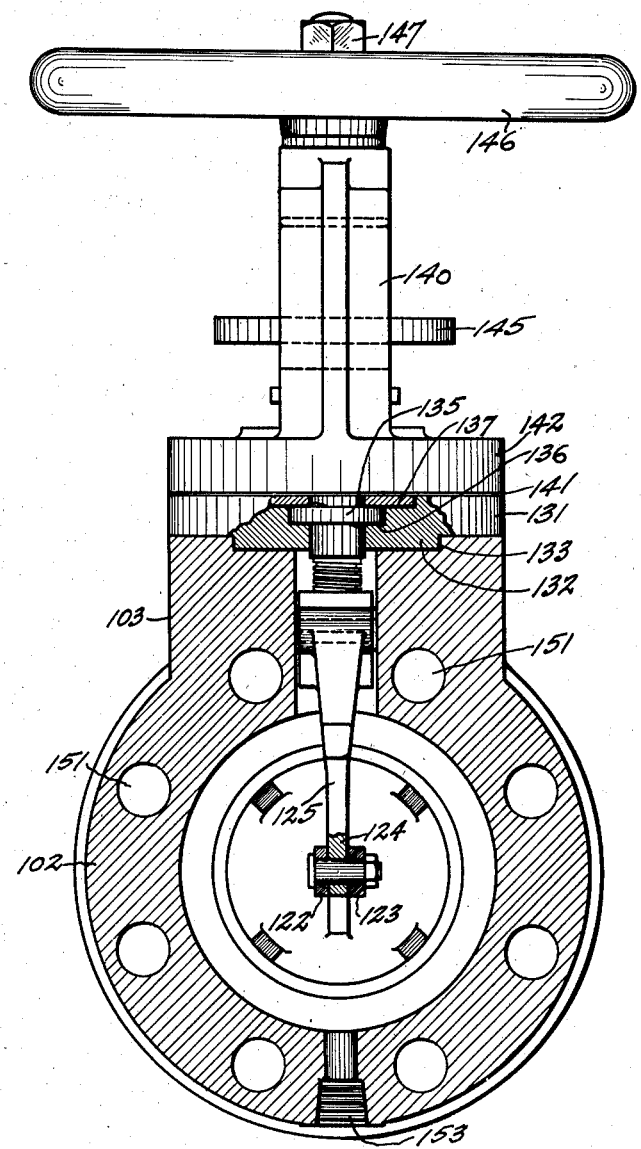
Figure 9 is a transverse sectional view partially in elevation of the valve in Figure 8.

As shown in Figure 9, the lower portion 102 of the valve casing is provided with axially extending bolt holes 151 that extend clear through the body to permit the application of pipe flanges to the valve by bolts extending through the valve body and the pipe flanges. The pin 126 that serves as a pivotal support for the bell crank extends clear through both walls 103 as shown in Figure 11 of the upper portion 103 of the valve casing and may be suitably sealed by gasket material or washers to prevent leakage.

Lubrication for the operating stem 130 may be provided by a hole extending axially downward through the stem to communicate with a small transverse hole through the threaded portion of the stem into the universal nut. Similarly, the pivot pin that supports the bell crank may be lubricated through a small opening extending through the pivot pin and communicating with the small passage transversely of the pin to the bearing surface. A threaded drain opening 153 is provided at the bottom of the valve which can be closed and sealed by suitable threaded plug.

Figure 8:
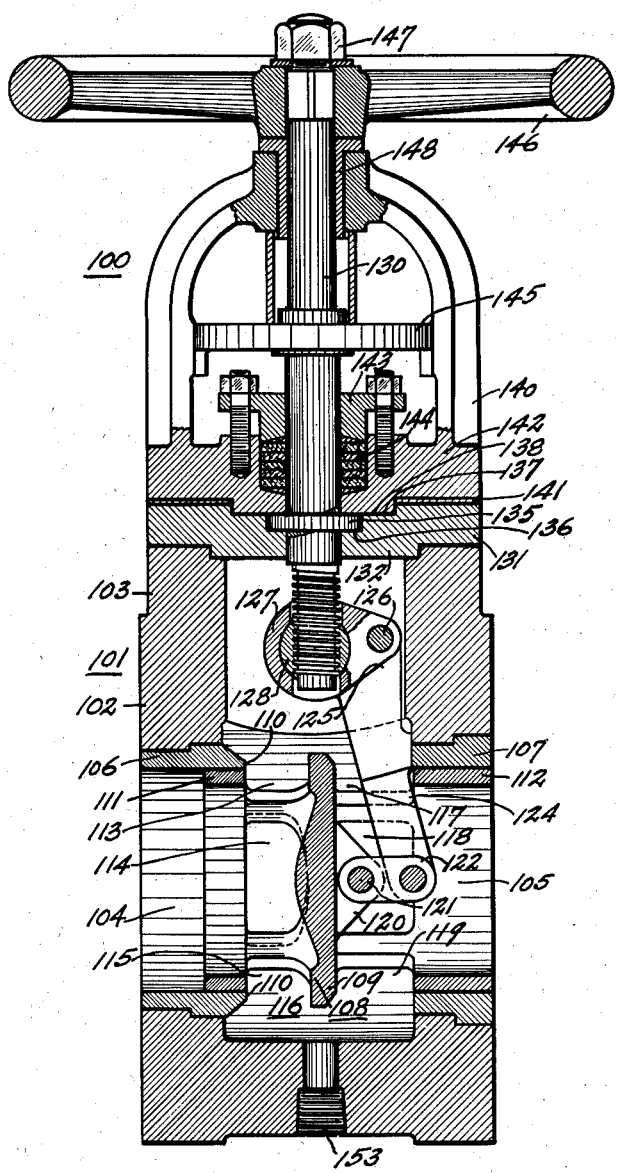
Figure 8 is a vertical, longitudinal, sectional view of a high pressure valve embodying the principles of my invention.

In order to form a strong body casing to withstand high pressure in a valve of the type shown in Figure 8, I employ a bored section of round stock for the lower body portion 102 and a bored section of round stock for the top body portion 103 and weld the two in proper position as illustrated. The boring may of course, be done after the two rounds are welded together. The resulting structure provides a casing with the equivalent strength of a forging and is simple and economical to manufacture.

This valve, as shown in Figure 8, may be similarly adapted to automatic operation by keying the bell crank or merely the depending lever to an operating shaft located where the pivotal pin 126 is located and having an end brought out for connection to a suitable actuating mechanism controlled by automatic equipment in accordance with a condition to be maintained.

My invention is not limited, however, to the specific details of construction that I have illustrated since they may be variously modified without departing from the spirit and scope of the invention as set forth in the appended claims.

I claim as my invention:

1. A valve comprising a housing provided with an inlet passage and an outlet passage, a valve axially movable in one passage in the direction of flow, a pivoted bell-crank pivotally supported on a pivot pin in the housing wall, one end of the bell-crank being self-adjustably connected to the valve, and a rotatable shaft threaded at its inner end and extending into the housing and connected to the other end of the bell-crank through a universal self-aligning nut, said nut consisting of an internally transversely threaded rod in a cylindrical socket in the bell-crank, the shaft threading into the rod.

2. A universal self-adjusting mechanical connection for connecting the lower end of a non-rising operating stem of a valve and one arm of a pivoted bell-crank for the valve, said connection comprising said arm of the bell-crank, provided with a cylindrical hole parallel to the pivotal axis of the bell-crank, a cylindrical element in the cylindrical hole and axially movable in the hole to be self-adjustable, the cylindrical element being transversely threaded to receive the threaded end of the operating stem.

NEWTON F. FONER.